United States Patent [19]

Shimanuki

[11] Patent Number: 4,796,130
[45] Date of Patent: Jan. 3, 1989

[54] CARRIAGE LOCK MECHANISM OF A MAGNETIC RECORDING/REPRODUCTION APPARATUS

[75] Inventor: Machio Shimanuki, Tokyo, Japan

[73] Assignee: Kabushiki Kaisha Toshiba, Kawasaki, Japan

[21] Appl. No.: 935,014

[22] Filed: Nov. 26, 1986

[30] Foreign Application Priority Data

Nov. 30, 1985 [JP] Japan .................. 60-269624

[51] Int. Cl.$^4$ .......................... G11B 5/54; G11B 21/22
[52] U.S. Cl. ........................... 360/105; 360/137
[58] Field of Search ............... 360/105, 104, 86, 75, 360/97–99, 103, 137

[56] References Cited

U.S. PATENT DOCUMENTS

| 4,139,874 | 2/1979 | Shiraishi | 360/105 |
| 4,331,989 | 5/1982 | Viskochil | 360/86 |
| 4,538,193 | 8/1985 | Dimmick et al. | 360/103 |
| 4,562,500 | 12/1985 | Bygdnes | 360/105 |
| 4,647,997 | 3/1987 | Westwood | 360/105 |
| 4,660,120 | 4/1987 | Manzke et al. | 360/105 |
| 4,692,829 | 9/1987 | Campbell | 360/105 |

FOREIGN PATENT DOCUMENTS

| 59-79470 | 5/1984 | Japan . |
| 60-173771 | 9/1985 | Japan .................. 360/86 |
| 60-214481 | 10/1985 | Japan . |
| 60-214482 | 10/1985 | Japan . |

*Primary Examiner*—John H. Wolff
*Assistant Examiner*—Matthew J. Bussan
*Attorney, Agent, or Firm*—Finnegan, Henderson, Farabow, Garrett, & Dunner

[57] ABSTRACT

A carriage lock mechanism is provided with a lock member mounted on a movable member of the carriage mechanism, a lock pawl for engaging with the lock member to lock the carriage mechanism, and a spring for biasing the lock pawl in a direction where the lock pawl engages with the lock member, wherein a sliding surface on which the distal end of the lock pawl slides during the lock operation is formed on the lock member, and the sliding surface has a shape corresponding to a locus of the lock member. If the movable member of the carriage mechanism is to be pivoted about a shaft, the sliding surface consists of an arc surface having the shaft as its center.

8 Claims, 6 Drawing Sheets

CARRIAGE LOCK MECHANISM OF A MAGNETIC RECORDING/REPRODUCTION APPARATUS

BACKGROUND OF THE INVENTION (1) Field of the Invention

The present invention relates to a carriage lock mechanism of a magnetic recording/reproduction apparatus, especially of a hard disk drive and, more particularly, to a carriage lock mechanism capable of preventing generation of fine dust particles due to friction between the components during a locking operation.

(2) Description of the Prior Art

A typical conventional hard disk apparatus and its carriage lock mechanism will be described below with reference to FIG. 1 and FIGS. 2A, 2B, and 2C.

This conventional apparatus has magnetic disk 11, as shown in FIG. 1. Disk 11 is coupled to and rotated by spindle motor 12.

A carriage mechanism is provided near disk 11. This carriage mechanism includes head arm 13 and head arm supporting block 14, and magnetic head 9 is mounted through suspension 10 to the distal end of arm 13. Head 9 is arranged near the upper surface of disk 11. Arm 13 and block 14 are supported to be rotatable about pivot shaft 15 in a plane parallel to the surface of disk 11.

A voice coil motor is connected to block 14. This voice coil motor consists of coil 16 mounted on block 14 and magnet 17 mounted on a frame. Arm 13 and block 14 are rotated by the voice coil motor, and head 10, mounted on the distal end of arm 13, is moved radially along disk 11 to perform a so-called seek operation. Thus, data is written in or read out from disk 11 by head 9.

This hard disk drive also has a carriage lock mechanism. When disk 11 is not rotated, head 9 is moved to a portion of disk 11 and this portion is not used for data recording. Disk 11 is kept fixed at this position by the above-mentioned carriage lock mechanism. Therefore, even when an external impact acts on the apparatus, damage to head 9 and disk 11 is prevented. The carriage lock mechanism has, as shown in FIGS. 2A, 2B, and 2C, lock member 18 mounted on block 14 and lock pawl 19 engaging with member 18 to perform a locking operation. Pawl 19 is supported by shaft 23, pivoted by a pivoting drive mechanism, and engaged with or disengaged from member 18. The pivoting drive mechanism for pawl 19 consists of spring 22 which biases pawl 19 in an engaging direction, i.e., a direction indicated by arrow 24 in FIG. 2A, and solenoid 21, which pivots pawl 19 in a disengaging direction, i.e., a direction indicated by arrow 26 in FIG. 2B. One end of the plunger inserted in solenoid 21 is connected to pawl 19.

In such a carriage lock mechanism, upon deenergization of solenoid 21, pawl 19 is pivoted in a direction of arrow 24 by a biasing force of spring 22, and hook 25, at the distal end of pawl 19, is engaged with member 18, thereby fixing the above carriage mechanism at a predetermined position, as shown in FIG. 2A. When the hard disk drive is in operation, solenoid 21 is energized, pawl 19 is pivoted in a direction of arrow 26 in FIG. 2B against a biasing force of spring 22, and gap G1 is formed between the distal ends of pawl 19 and member 18, so that block 14 and arm 13 are pivotal. When the hard disk drive is stopped from an operating state, as shown in FIG. 2C solenoid 21 is deenergized, and block 14 and arm 13 are pivoted to predetermined positions by the voice coil motor. In this case, the distal end of pawl 19 abuts against an inclined portion of member 18, and when member 18 is pivoted together with block 14, the distal end of pawl 19 is pushed upward by a height G2 along the inclined portion of member 18 against the biasing force of spring 22. When member 18 is pivoted to a predetermined position, its distal end is engaged with pawl 19.

In such a magnetic recording/reproduction apparatus, especially in a hard disk drive, the magnetic recording density of the magnetic disk is very high, and, upon operation, a magnetic head floats above the magnetic disk. A gap between a surface of the magnetic disk and the magnetic head is very small on the order of, for example, 0.3 to 0.5 $\mu$m. For this reason, a head crash occurs in the presence of even extremely small dust particles, destroying the recording data. In order to prevent the operation failure, such a hard disk drive is housed in a clean case having no particles therein.

The above-mentioned carriage mechanism, the carriage lock mechanism, and the like are housed in the case. If a lubricant is applied to movable portions of these mechanisms, particles of the lubricant are formed in the clean case. For this reason, lubricants cannot be used for the mechanisms housed in the case. Thus, when the distal end of pawl 19 abuts against and slides along the inclined portion of member 18, fine dust particles are formed because of direct friction between metals, sometimes resulting in an operation failure of the hard disk drive due to these particles. Especially in this conventional apparatus, when the distal end of pawl 19 is pushed upward along the inclined portion of member 18, an excess load is produced therebetween creating a large amount of particles.

In order to eliminate the above drawbacks, the present invention provides a carriage lock mechanism capable of completely preventing formation of particles during operation.

SUMMARY OF THE INVENTION

A carriage lock mechanism according to the present invention comprises a lock member mounted on a movable member of a carriage mechanism, such as an arm supporting block, and a lock pawl engaging with this lock member. The lock pawl is biased by a spring in a direction for causing the pawl to engage with the lock member, and is driven by a drive mechanism against the above spring in a direction for causing the pawl to disengage from the lock member. A sliding surface on which the distal end of the above lock pawl slides during the locking operation, and an engaging portion, formed on an edge of the sliding portion, for engaging with the distal end of the above lock pawl, are formed on the lock member. The above sliding surface is formed along a moving locus of the above lock member.

According to an embodiment of the present invention, the above lock member is so arranged as to be pivoted together with the arm supporting block, and its sliding surface is formed on a side surface of the lock member and, more particularly, on an arc surface having as its center a pivoting center of the lock member. Therefore, during the carriage lock operation, although the distal end of the lock pawl slides on the sliding surface of the lock member, the sliding surface does not push the distal end of the lock pawl upward against the biasing force of the spring because of its arc shape, so that the load produced during sliding is reduced to prevent formation of particles. According to another embodiment of the present invention, the sliding surface is formed on a plane parallel to a pivoting surface of the lock member. According to still another embodiment, when the distal end of the lock member slides on the sliding surface toward the engaging portion described above, the sliding surface is formed to incline "downward" with respect to the locus of the lock member, so that the lock pawl is moved in a direction to reduce the biasing force of the above-mentioned spring.

In addition, in the embodiments of the present invention, the lock member and the lock pawl are formed of synthetic resin materials. These synthetic resin materials are easily deformed and have a large ductility, thereby rarely forming particles when the lock pawl slides against the lock member.

BRIEF DESCRIPTION OF THE DRAWINGS

The present invention will be readily understood according to a description of the embodiments with reference to the accompanying drawings, in which.

DETAILED DESCRIPTION OF THE PREFERRED EMBODIMENTS

Figure 1:
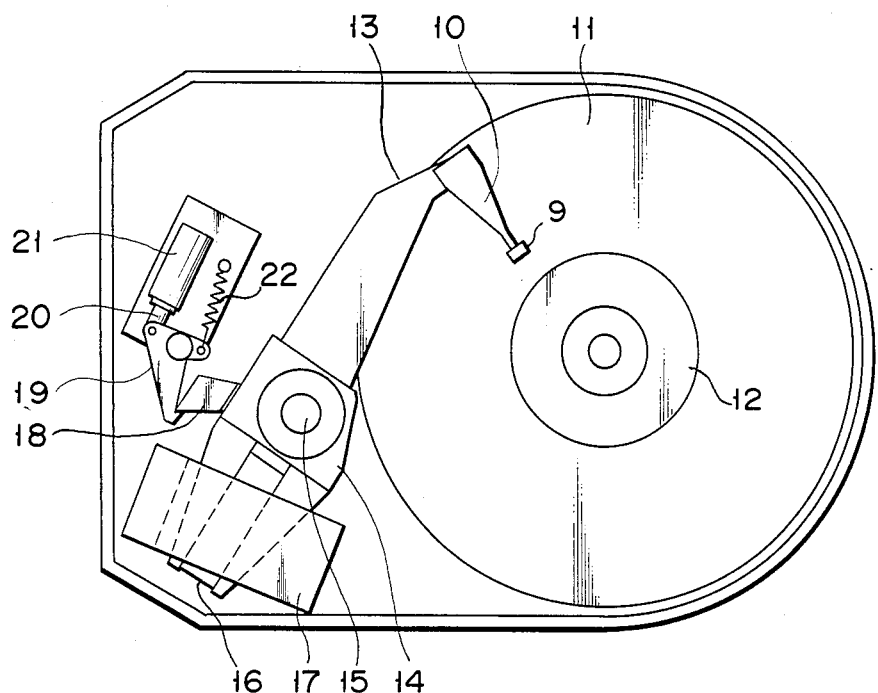
FIG. 1 is a plan view of a conventional hard disk drive.
Figure 2A:
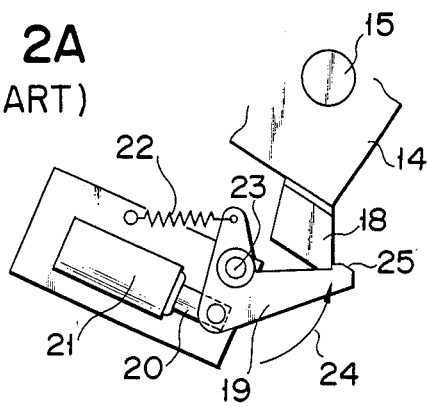
FIGS. 2A to 2C are plan views of a structure and an operation of a conventional carriage lock mechanism.
Figure 2B:
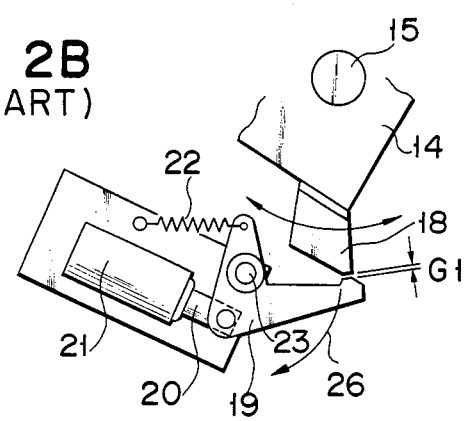
Figure 2C:
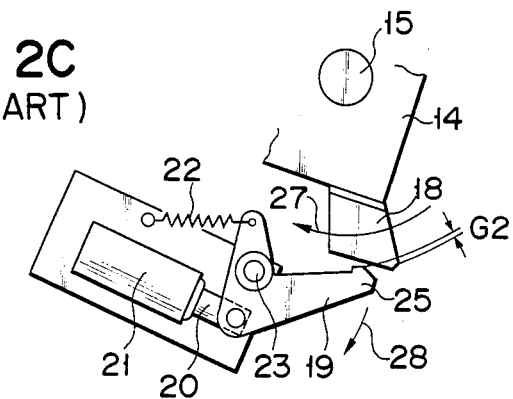
Figure 3A:
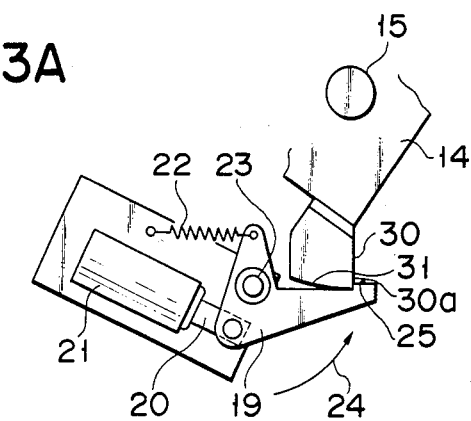
FIGS. 3A to 3C are plan views of a structure and an operation of a carriage lock mechanism according to a first embodiment of the present invention.
Figure 3B:
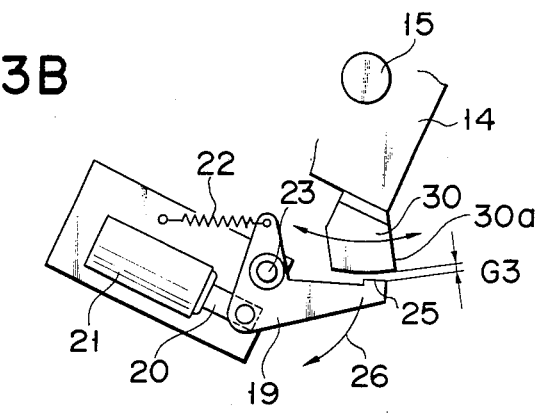
Figure 3C:
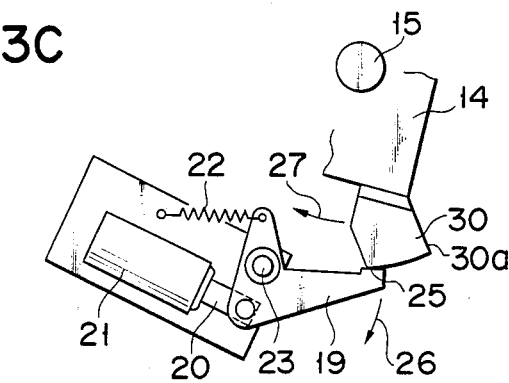

FIGS. 3A to 3C show a carriage lock mechanism according to a first embodiment of the present invention. This carriage lock mechanism is used for a hard disk drive such as the apparatus disclosed in the conventional example described above.

Reference numeral 14 denotes an arm supporting block which is arranged to be pivoted about pivot shaft 15. Lock plate member 30 arranged to be pivoted together with block 14 about shaft 15 is mounted on block 14. Lock pawl 19 is provided near lock plate member 30. Pawl 19 is pivotally supported by shaft 23, and hook 25 is formed at the distal end of pawl 19. Engaging portion 30a is formed at the distal end of lock plate member 30, with which hook 25 of pawl 19 engages, thereby locking block 14 at a predetermined position.

Spring 22 is connected to pawl 19 to bias it, so that pawl 19 is pivoted in a direction in which its hook 25 engages with engaging portion 30a of lock plate member 30, i.e., a direction indicated by arrow 24 in FIG. 3A. Plunger 20, inserted in solenoid 21, is also connected to pawl 19. Solenoid 21 is energized to attract plunger 20, thereby pivoting pawl 19 in a direction for disengaging, i.e., a direction indicated by arrow 26 in FIG. 3B against the biasing force of spring 22.

Sliding surface 31, at the distal end of lock plate member 30, includes a surface along the locus of lock plate member 30, e.g., an arc surface having shaft 15 as its center in this embodiment.

Both lock plate member 30 and pawl 19 are formed of synthetic resin materials; for example, lock plate member 30 is formed of a polycarbonate resin, and pawl 19 is formed of a polyamide resin.

According to the first embodiment of the present invention having the above arrangement, hook 25 of pawl 19 engages with engaging portion 30a of lock plate member 30 in a locking state, as shown in FIG. 3A, thereby locking block 14 so as not to be pivoted.

On the other hand, in an unlocked state, solenoid 21 is energized to attract plunger 20 so that pawl 19 is pivoted against the biasing force of spring 22, as shown in FIG. 3B. In this state, gap G3 is formed between hook 25 of pawl 19 and distal end face 31 of lock plate member 30 so that block 14 is pivotal.

When the mechanism is operated from unlocked to locked states, solenoid 21 is deenergized, and block 14 is pivoted to a predetermined locked position by a voice coil motor. In this case, as shown in FIG. 3C, hook 25 of pawl 19 abuts against sliding surface 31 of lock plate member 30 by the biasing force of spring 22. In this condition, when lock plate member 30 is pivoted together with block 14 and engaging portion 30a of lock plate member 30 corresponds to hook 25 of pawl 19, hook 25 engages with engaging portion 30a to complete locking by the biasing force of spring 22, as shown in FIG. 3A. Since surface 31 is formed along the locus of lock plate member 30, i.e., the arc surface having shaft 15 as its center, pawl 19 is not pivoted against the biasing force of spring 22 when hook 25 of pawl 19 slides along surface 31. Thus, the load between hook 25 and surface 31 is so small that formation of particles by friction between the materials can be prevented.

In this embodiment, lock plate member 30 and pawl 19 are formed of synthetic resin materials. The synthetic resin materials are easily deformed and have a large ductility. Even when pawl 19 slides along lock plate member 30 without a lubricant therebetween, only a small frictional force is generated and dust particles are rarely formed.

Figure 4:
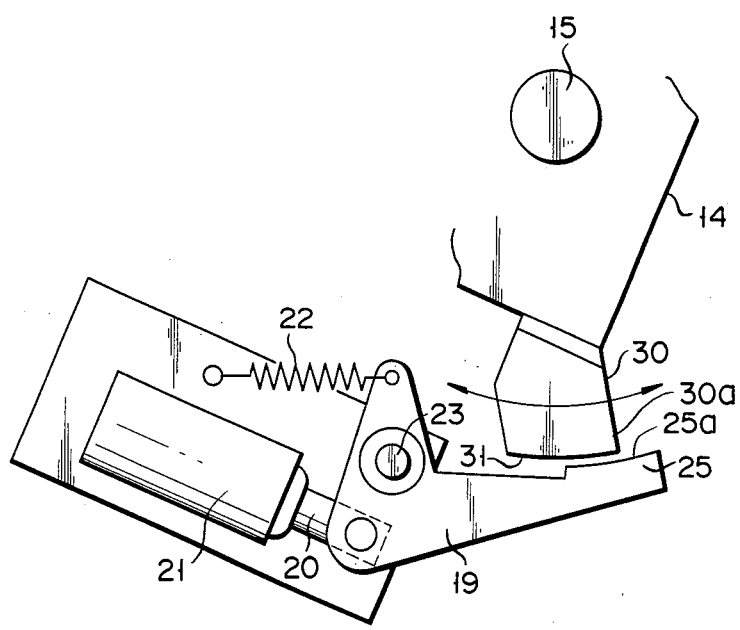
FIG. 4 is a plan view of a carriage lock mechanism according to a second embodiment of the present invention.

FIG. 4 shows a second embodiment of the present invention. In this embodiment, a surface of hook 25 at the distal end of pawl 19, which opposes surface 31 of lock plate member 30, is arc surface 25a corresponding to surface 31.

According to this embodiment, surface 31 of lock plate member 30 uniformly contacts the entire surface 25a of hook 25 of pawl 19 to generate a low pressure therebetween, thereby further preventing friction and formation of particles.

Figure 5:
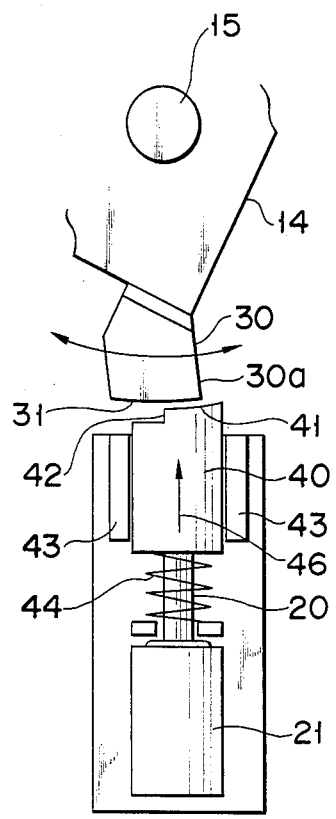
FIG. 5 is a plan view of a carriage lock mechanism according to a third embodiment of the present invention.

FIG. 5 shows a third embodiment of the present invention. In this embodiment, lock pawl 40 is guided and linearly moved by a pair of guides 43 to engage with and disengage from lock plate member 30. Note that arc-shaped sliding surface 41 and step 42 are formed at the distal end of pawl 40. Surface 41 abuts against and slides on surface 31 of lock plate member 30, and hook 42 engages with engaging portion 30a of lock plate member 30. Plunger 20 inserted in solenoid 21 is connected to pawl 40 which is biased by spring 44 in a direction for causing pawl 40 to engage with lock plate member 30.

Figure 6:
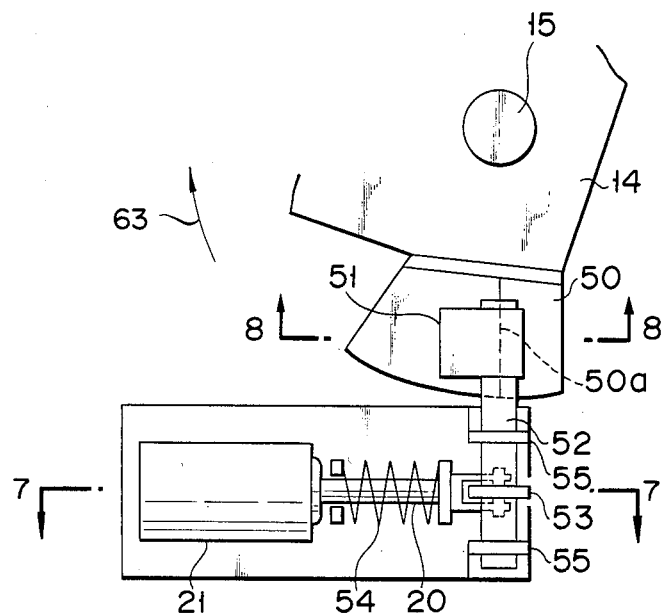
FIG. 6 is a plan view of a carriage lock mechanism according to a fourth embodiment of the present invention.
Figure 8:
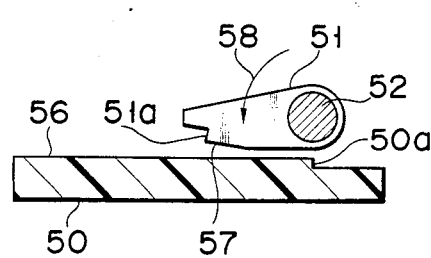
FIG. 8 is a sectional view taken along the line 8—8 of FIG. 6.
Figure 7:
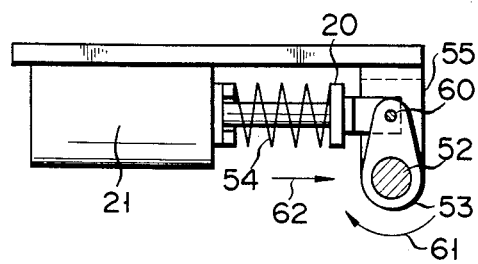
FIG. 7 is a cross-sectional view taken along line 7—7 in FIG. 6.

FIGS. 6 to 8 show a fourth embodiment of the present invention. In this embodiment, an upper surface of lock member 50, mounted on block 14, includes sliding surface 56, arranged on a plane parallel to a plane on which member 50 rotates about shaft 15. Engaging step 50a is formed at an edge of surface 56. Pivot shaft 52 is disposed above surface 56 of member 50 and is rotatably supported by a pair of bearings 55. Lock pawl 51 is mounted on the distal end of shaft 52, and hook step 51a and sliding surface 57 are formed at the distal end of lock pawl 51. Lever 53 is mounted on the proximal end of shaft 52 and faces downward. Plunger 20 is connected to the distal end of lever 53. Shaft 52 is biased by spring 54 in a direction in which its pawl 51 engages with member 50.

The operation of this embodiment is as follows. Solenoid 21 is energized and plunger 20 is attracted. Upon the interruption of the power supply, solenoid 21 is in a non-energized state. Plunger 20 is rotated in a direction indicated by arrow 62 and link 53, coupled by pin 60, is rotated in a direction indicated by arrow 61. (Shaft 52 is fixed to lever 53 and held by bearing 55.) Pawl 51, fixed to the shaft, is rotated in a direction of arrow 58, so that the portion of surface 57 is brought into engagement with the portion of surface 56 of lock member 50.

Arm support block 14 is rotated in a direction of arrow 63 simultaneously with the interruption of the power supply. Lock member 50, mounted to arm support block 14, is also rotated. Lock member 50, while contacting the portion of surface 57 of pawl 51, continues its rotation. When step 50a is brought to a position corresponding to step 51a of pawl 51, of pawl 51 is rotated in the direction of an arrow 58 into locking engagement with step 50a.

Note that the present invention is not limited to the above embodiments. It is obvious that various changes and modifications can be made by the skilled in the art without departing from the spirit and scope of the present invention.

What is claimed is:

1. A carriage lock mechanism for a magnetic recording/reproduction apparatus provided with a carriage mechanism for moving a magnetic head along a surface of a magnetic recording medium, wherein said carriage mechanism is locked at a predetermined position and the magnetic head is locked at a position corresponding to a non-recording region of said magnetic recording medium when the apparatus is not operated, comprising:

a lock member, mounted to a movable member of said carriage mechanism;
   a lock pawl, mounted on a stationary member, for engaging with said lock member to lock said carriage mechanism;
   urging means for biasing said lock pawl in a direction where said lock pawl engages with said lock member; and
   an electro-mechanical lock pawl drive mechanism for driving said lock pawl against the biasing force of said urging means, in such a direction as to release said lock pawl from said lock member,
   wherein at least one of said lock member and said lock pawl is formed of a synthetic resin material; said lock member having an arcuate shaped sliding surface corresponding to a locus of said lock member for allowing said lock pawl to slide smoothly on the sliding surface of said lock member while said lock pawl is urged against the sliding surface during return of said carriage mechanism to said predetermined position; and said lock member having an engaged portion, formed on an edge of the sliding surface, for engaging said lock pawl when said lock pawl reaches the edge of the sliding surface during movement of the carriage mechanism.

2. A mechanism according to claim 1, wherein said movable member of said carriage mechanism is pivoted about a pivoting axis of a shaft, and the sliding surface of said lock member is an arc surface having a radius originating at said pivot axis of said shaft.

3. A mechanism according to claim 2, wherein an arcuate surface complementary corresponding to the sliding surface of said lock member and put in a sliding contact with said sliding surface, is formed at a distal end of said lock pawl.

4. A mechanism according to claim 1, wherein said lock pawl is pivotally supported, and its distal end engages with or disengages from said lock member upon pivoting of said lock pawl.

5. A mechanism according to claim 1, wherein said pawl is linearly guided to move, and its distal end engages with or disengages from said lock member upon linear movement of said lock pawl.

6. A mechanism according to claim 1, wherein said lock pawl drive mechanism drives said lock pawl by a solenoid.

7. A mechanism according to claim 1, wherein said urging means is a spring.

8. A carriage lock mechanism for a magnetic recording/reproduction apparatus provided with a carriage mechanism for moving a magnetic head along a surface of a magnetic recording medium, wherein said carriage mechanism is locked at a predetermined position and the magnetic head is locked at a position corresponding to a non-recording region of said magnetic recording medium when the apparatus is not operated, comprising:

a lock member, mounted to a movable member of said carriage mechanism;
   a lock pawl, mounted on a stationary member, for engaging with said lock member to lock said carriage mechanism;
   urging means for biasing said lock pawl in a direction where said lock pawl engages with said lock member; and
   an electro-mechanical lock pawl drive mechanism for driving said lock pawl against the biasing force of said urging means, in such a direction as to release said lock pawl from said lock member.
   wherein at least one of said lock member and said lock pawl is formed of a synthetic resin material; said lock member having a flat sliding surface perpendicular to a pivot axis of said lock member for allowing said lock pawl to slide smoothly on the sliding surface of said lock member while said lock pawl is urged against the sliding surface during return of said carriage mechanism to said predetermined position; and said lock member having an engaged portion, formed on said flat sliding surface, for engaging said lock pawl when said lock pawl reaches said engaged portion during movement of the carriage mechanism.

* * * * *